Patented Aug. 3, 1954

2,685,595

UNITED STATES PATENT OFFICE 2,685,595

PRODUCTION OF WATER SOLUBLE CHROMIUM CONTAINING AZOMETHINE DYESTUFFS

Helmut Pfitzner and Otto Kaufmann, Ludwigshafen (Rhine), Germany, assignors to Badische Anilin- & Soda-Fabrik Aktiengesellschaft, Ludwigshafen am Rhine, Germany No Drawing. Application July 2, 1952,
Serial No. 296,926

Claims priority, application Germany
June 29, 1950

11 Claims. (Cl. 260—438)

This invention relates to water-soluble chromium containing azomethine dyestuffs and a process of producing same.

This application is a continuation-in-part of our copending application Ser. No. 233,702, filed June 26, 1951.

We have found that valuable water-soluble chromium containing azomethine dyestuffs can be obtained by heating monoazomethine dyestuffs containing one atom of chromium to one molecule of the monoazomethine dyestuff in the presence of a diluent with colorless organic compounds which themselves are capable of forming complex chromium compounds.

The expression azomethine dyestuffs denotes compounds which are obtained by condensing aromatic amines with aromatic aldehydes. These compounds are also named aniles. Since, however, these compounds are in the most cases dyestuffs and formally comparable with azo dyestuffs they are commonly termed in the art azomethine dyestuffs. The formal difference between azo dyestuffs and azomethine dyestuffs is that one nitrogen atom of the azo bridge of an azo dyestuff is replaced by a methine group.

Suitable initial monoazomethine dyestuffs for the present process are those which contain one atom of chromium to one molecule of the dyestuff. The azomethine dyestuffs have therefore to contain in the ortho-position to the azomethine bridge groups which are capable of binding chromium, e. g. hydroxy or carboxy groups. Colorless organic compounds which are capable of forming complex chromium compounds are for instance alkylolamines, polyglycols, oxalic acid, tartaric acid, citric acid, malic acid, nitrilo-triacetic acid, ethylendiamino-tetraacetic acid, 1,2-dihydroxybenzenes, ortho- and peri-dihydroxynaphthalenes, ortho-hydroxynaphthoic acids, phthalic acids, ortho-nitrosonaphthols, 8-hydroxyquinolines, pyridine sulfonic or carboxylic acids, and especially 2-hydroxy benzoic acid, 2-hydroxy benzoic sulfonic acids and 2-hydroxybenzoic acid sulfonic acid amides.

The reaction is carried out by heating the components in the presence of a diluent, such as water or an alcohol at from about 50 to 100° C. It is preferable to add some condensation agent, such as sodium acetate.

The water soluble dyestuffs formed are isolated in the usual manner by salting them out or by distilling off the diluent.

The new dyestuffs dye wool, silk, leather, casein wool and synthetic fibres from a neutral to weak acid bath and yield dyeings of high fastness properties in particular of great fastness to light.

The following examples illustrate the invention. The parts are by weight.

Example 1

A mixture of 17 parts of the azomethine dyestuff prepared from 1-hydroxy-2-amino-4-nitrobenzene and 2-hydroxy-benzaldehyde, containing one atom of chromium to one molecule of the dyestuff in complex combination, 11 parts of 2-hydroxy-benzoic acid-5-sulfonic acid amide, 11 parts of sodium acetate and 500 parts of ethylalcohol is heated to boiling while stirring for 5 hours. After removing the alcohol by distillation there remains a water-soluble dyestuff which dyes wool yellow shades from a neutral bath.

The dyestuff corresponds to the formula

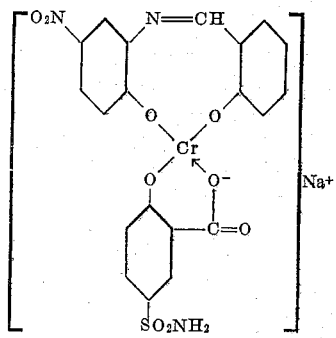

Example 2

A mixture of 20 parts of the azomethine dyestuff prepared from 1-hydroxy-2-amino-benzene-4-sulfonic acid amide and 2-hydroxy-5-nitrobenzaldehyde, containing one atom of chromium to one molecule of the dyestuff, 16 parts of 2-hydroxybenzoic acid-5-sulfonic acid phenylamide, 14 parts of sodium acetate and 1000 parts of water is heated to boiling while stirring for 3 hours. After rendering the reaction mixture alkaline, the whole is filtered and from the filtrate the new dyestuff is salted out by the addition of sodium chloride. The new dyestuff dyes wool yellow shades from a weak acid bath.

The dyestuff corresponds to the formula

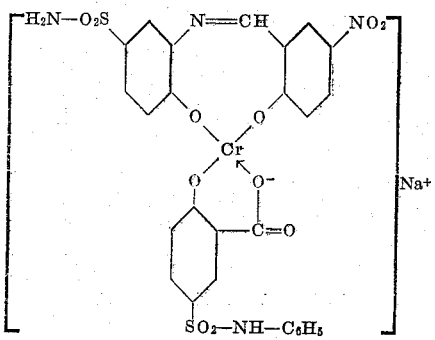

Example 3

A mixture of 21 parts of the azomethine dyestuff prepared from 1-hydroxy-2-amino-benzene-4-sulfonic acid amide and 2-hydroxy-naphthalene-1-aldehyde and containing one atom of chromium to one molecule of the dyestuff, 16 parts of 2-hydroxy-benzoic acid-5-sulfonic acid phenyl amide, 14 parts of sodium acetate and 500 parts of ethylalcohol is boiled while stirring for 2 hours. After filtering off the reaction mixture and removing the alcohol from the filtrate by distillation a water-soluble dyestuff is obtained which dyes wool brown orange shades from a weak acid bath.

The new dyestuff corresponds to the formula

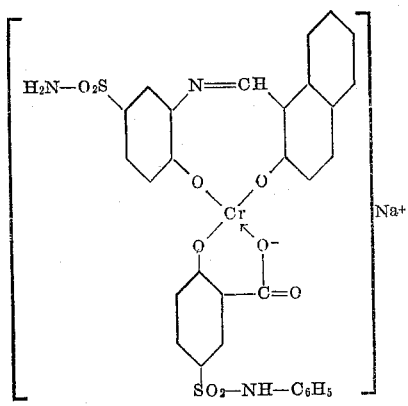

Example 4

A mixture of 23 parts of the azomethine dyestuff from 1-hydroxy-2-amino-4,6-dinitro-benzene and 2-hydroxy-benzene-aldehyde-5-sulfonic acid containing one atom of chromium to one molecule of the dyestuff, 8 parts of 8-hydroxyquinoline, 14 parts of sodium acetate and 500 parts of water is heated to boiling for 2 hours. After filtering off the reaction mixture the new dyestuff is obtained from the filtrate by distilling off the water. It dyes wool yellow shades from a weak acid bath.

The new dyestuff corresponds to the formula

Example 5

A mixture of 20 parts of the azomethine dyestuff from 2-amino-5-nitro-benzoic acid and 2-hydroxy-3.5-dichlorobenzene-aldehyde, containing one atom of chromium to one molecule of the dyestuff, 16 parts of 2-hydroxy-benzoic acid-5-sulfonic acid phenyl amide, 14 parts of sodium acetate and 500 parts of ethylalcohol is heated to boiling while stirring for 2 hours. From the filtered reaction mixture the new dyestuff is obtained by distilling off the alcohol. It dyes wool yellow shades from a weak acid bath.

The new dyestuff corresponds to the formula

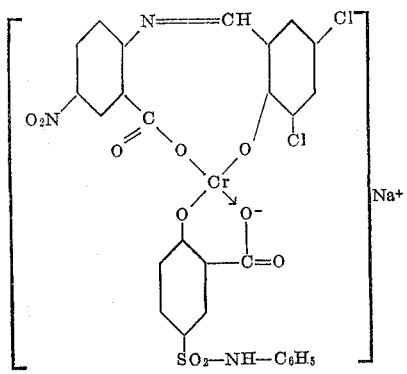

Example 6

A mixture of 20 parts of the chromium containing azomethine dyestuff from 1-hydroxy-2-amino-5-nitrobenzene and 2-hydroxy-3.5-dichlorobenzene-aldehyde containing one atom of chromium to one molecule of the dyestuff, 16 parts of 2-hydroxy benzoic acid-5-sulfonic acid phenyl amide, 14 parts of sodium acetate and 1000 parts of water is heated to boiling while stirring for 2 hours. After rendering the reaction mixture alkaline and filtering, the new dyestuff is obtained from the filtrate by salting it out with sodium chloride. It dyes wool red shades from a weak acid bath.

The dyestuff corresponds to the formula

Example 7

A mixture of 22 parts of the azomethine dyestuff from 1-hydroxy-2-amino-benzene-4-sulfonic acid amide and 2-hydroxy-3.5-dichlorobenzene-aldehyde containing one atom of chromium to one molecule of the dyestuff, 7 parts of 2-hydroxy benzoic acid, 14 parts of sodium acetate and 500 parts of water is heated to boiling while stirring for 3 hours. After cooling, the precipitated dyestuff is filtered off by suction and dried. It dyes wool yellow shades from a weak acid bath.

The dyestuff corresponds to the formula

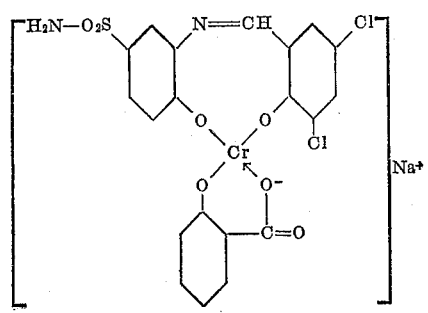

What we claim is:
1. A process for the production of chromium containing water-soluble azomethine dyestuffs which comprises heating a chromed monoazomethine dyestuff, containing one molecule of the monoazomethine dyestuff chelated to one atom of chromium in the presence of a diluent with a chelating compound selected from the group consisting of a 2-hydroxy-benzoic acid, a 2-hydroxy-benzoic acid sulfonic acid, a 2-hydroxy-benzoic acid sulfonic acid amide, and an 8-hydroxyquinoline.
2. A process for the production of chromium containing water-soluble azomethine dyestuffs which comprises heating a chromed monoazomethine dyestuff, containing one molecule of the monoazomethine dyestuff chelated to one atom of chromium in the presence of a diluent and sodium acetate with a chelating compound selected from the group consisting of a 2-hydroxy-benzoic acid, a 2-hydroxy-benzoic acid sulfonic acid, a 2-hydroxy-benzoic acid sulfonic acid amide, and an 8-hydroxyquinoline.
3. A process for the production of chromium containing water-soluble azomethine dyestuffs which comprises heating a chromed monoazomethine dyestuff, containing one molecule of the monoazomethine dyestuff chelated to one atom of chromium in the presence of a diluent and sodium acetate with a 2-hydroxy-benzoic acid.
4. A process for the production of chromium containing water-soluble azomethine dyestuffs which comprises heating a chromed monoazomethine dyestuff, containing one molecule of the monoazomethine dyestuff chelated to one atom of chromium in the presence of a diluent and sodium acetate with a 2-hydroxy-benzoic acid sulfonic acid amide.

5. The azomethine dyestuff

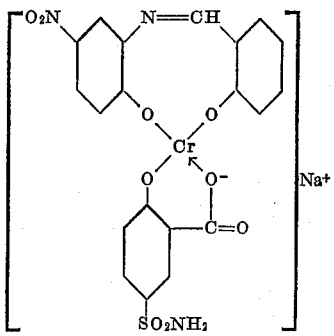

6. The azomethine dyestuff

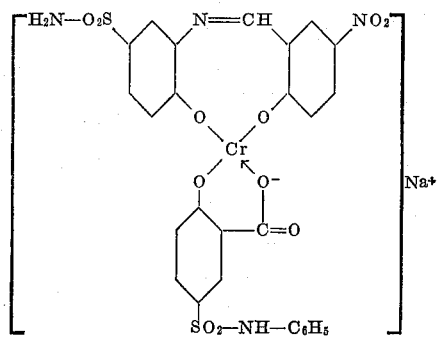

7. The azomethine dyestuff

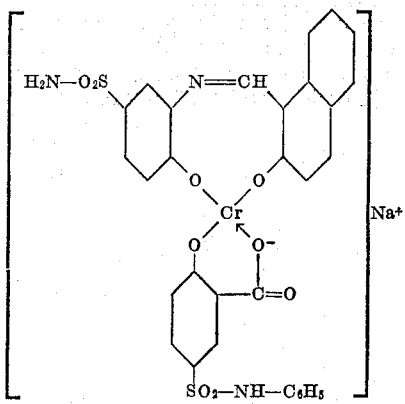

8. The azomethine dyestuff

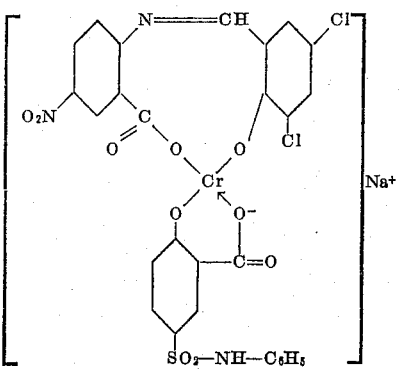

9. The azomethine dyestuff

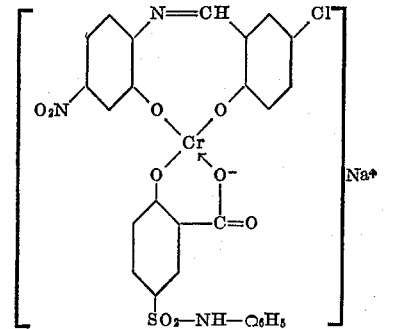

10. A process for the production of chromium containing water-soluble azomethine dyestuffs which comprises heating a chromium containing dyestuff containing chelated to each chromium atom one molecule of a monoazomethine dyestuff selected from the group consisting of o,o'-dihydroxy and o-carboxy-o'-hydroxy azomethine dyestuffs in the presence of water with about one molar proportion of a chelating compound selected from the group consisting of a 2-hydroxy-benzoic acid, a 2-hydroxy-benzoic acid sulfonic acid, a 2-hydroxy-benzoic acid sulfonic acid amide, and an 8-hydroxy-quinoline.

11. A chromium containing azomethine dyestuff containing chelated to each chromium atom one molecule of a monoazomethine dyestuff selected from the group consisting of o,o'-dihydroxy and o-carboxy-o'-hydroxy azomethine dyestuffs and one molecule of a chelating compound selected from the group consisting of a 2-hydroxy-benzoic acid, a 2-hydroxy-benzoic acid sulfonic acid, a 2-hydroxy-benzoic acid sulfonic acid amide, and an 8-hydroxyquinoline.

References Cited in the file of this patent

UNITED STATES PATENTS

| Number | Name | Date |
|---|---|---|
| 2,345,485 | Krzikalla et al. | Mar. 28, 1944 |

OTHER REFERENCES

Pfeiffer et al.: Ber., vol. 74B, pages 935–941.